(12) United States Patent
Woerner et al.

(10) Patent No.: US 11,960,969 B2
(45) Date of Patent: Apr. 16, 2024

(54) QUANTUM AMPLITUDE ESTIMATION STATE PREPARATION FOR STOCHASTIC PROCESSES

(71) Applicant: International Business Machines Corporation, Armonk, NY (US)

(72) Inventors: Stefan Woerner, Zürich (CH); Almudena Carrera Vazquez, Thalwil (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 684 days.

(21) Appl. No.: 16/833,076

(22) Filed: Mar. 27, 2020

(65) Prior Publication Data
US 2021/0312313 A1 Oct. 7, 2021

(51) Int. Cl.
*G06N 10/00* (2022.01)
*G06F 17/11* (2006.01)
*G06N 7/01* (2023.01)

(52) U.S. Cl.
CPC ............. *G06N 10/00* (2019.01); *G06F 17/11* (2013.01); *G06N 7/01* (2023.01)

(58) Field of Classification Search
CPC .......... G06N 10/00; G06N 7/005; G06N 7/01; G06N 10/60; G06F 17/11; G06F 30/00; G06F 30/32; G06F 30/30; G06F 30/337; G06F 30/343
USPC ................. 703/17, 14, 13; 706/45
See application file for complete search history.

(56) References Cited

U.S. PATENT DOCUMENTS

| | | | |
|---|---|---|---|
| 7,113,967 B2 | 9/2006 | Cleve et al. | |
| 8,957,699 B2 | 2/2015 | Eastin | |
| 2016/0004976 A1 | 1/2016 | Chattopadhyay et al. | |
| 2016/0314406 A1 | 10/2016 | Wiebe et al. | |
| 2019/0251213 A1 | 8/2019 | Bishop et al. | |
| 2019/0258696 A1* | 8/2019 | Burchard | G06Q 99/00 |
| 2019/0378208 A1 | 12/2019 | Woerner et al. | |

(Continued)

FOREIGN PATENT DOCUMENTS

| | | |
|---|---|---|
| EP | 3417403 A1 | 12/2018 |
| JP | H08227682 A | 9/1996 |
| WO | 2017/143195 A1 | 8/2017 |

OTHER PUBLICATIONS

Woeerner, Stefan et al., "Quantum Risk Analysis", Feb. 8, 2019, Quantum Information, Naturel Partner Journals, The University of New South Wales. (Year: 2019).*

(Continued)

*Primary Examiner* — Cedric Johnson
(74) *Attorney, Agent, or Firm* — Amin, Turocy & Watson, LLP

(57) ABSTRACT

Systems and methods that facilitate quantum state preparation of a probability distribution and constructing a quantum operator for a stochastic process based on quantum state to facilitate quantum amplitude estimation. A loading component uses a context-aware distribution loading scheme to load arbitrary random distributions to facilitate preparing a quantum state of a probability distribution based on a structure of a quantum amplitude estimation algorithm, and an operating component constructs a quantum operator for arbitrary computable functions or stochastic processes based on the quantum state to perform quantum amplitude estimation.

16 Claims, 9 Drawing Sheets

(56) References Cited

U.S. PATENT DOCUMENTS

2020/0394276 A1   12/2020   Woerner et al.
2021/0049493 A1*   2/2021   Vivoli .................... G06V 20/69
2021/0182721 A1   6/2021   Li et al.

OTHER PUBLICATIONS

Rebentrost, Patrick et al., "Quantum Computational Finance: Monte Carlo Pricing of Financial Derivatives", Aug. 20, 2018, Physical Review A 98, American Physical Society. (Year: 2018).*

Grover et al., "Creating superpositions that correspond to efficiently integrable probability distributions" (Feb. 2008) arXiv:quant-ph/0208112v1 Aug. 15, 2002.

Plesch et al., "Quantum-state preparation with universal gate decompositions" DOI: https:doi.org/10.1103/PhysRevA.83.032302 American Physical Society. Phys. Rev. A 83, 032302 (Mar. 2011).

Zoufal et al., "Quantum Generative Adversarial Networks for Learning and Loading Random Distributions" Oct. 1, 2019. arXiv:1904.00043v2 [quant-ph] Sep. 30, 2019. 14 pages.

Suzuki et al., "Amplitude Estimation without Phase Estimation," arXiv:1904.10246v1 [quant-ph], Apr. 23, 2019, 16 pages.

Orus et al., "Quantum computing for finance: overview and prospects," arXiv:1807.03890v2 [quant-ph], Feb. 22, 2019, 13 pages.

Gilyen et al., "Optimizing quantum optimization algorithms via faster quantum gradient computation," In Proceedings of the 30th ACM-SIAM Symposium on Discrete Algorithms (SODA 2019), Jan. 2019, 20 pages.

Disclosed Anonymously, "Method for applying amplitude Q compensation to angle stacks and pre-stack gathers," An IP.com Prior Art Database Technical Disclosure, IP.com No. IPCOM000250062D, May 24, 2017, 12 pages.

Disclosed Anonymously, "Fit for Purpose Processing in the Quantum World," An IP.com Prior Art Database Technical Disclosure, IP.com No. IPCOM000255049D, Aug. 28, 2018, 7 pages.

Brassard, et al., Quantum Amplitude Amplification and Estimation, May 2, 2000, 32 Pages.

Montanaro, Proceedings of the Royal Society A: Mathematical, Physical and Engineering Sciences, Jul. 21, 2015, 20 Pages.

Rebentrost, et al., Quantum computational finance: Monte Carlo pricing of financial derivatives, Aug. 21, 2018, 17 pages.

Woerner, et al., Quantum risk analysis, Feb. 8, 2019, 17 pages.

Egger, et al., Credit Risk Analysis using Quantum Computers, Jul. 9, 2019, 8 pages.

Abrams, et al., Fast quantum algorithms for numerical integrals and stochastic processes, Aug. 28, 1999, 15 pages.

Shende, et al., Synthesis of Quantum Logic Circuits, IEEE Transactions on Computer-Aided Design of Integrated Circuits and Systems, Apr. 18, 2006, 19 pages.

Harrow, et al., Quantum algorithm for linear systems of equations, Sep. 30, 2009, 15 pages.

Glasserman, Monte Carlo Methods in Financial Engineering, 2004, 613 pages.

Aleksandrowicz, et al., Qiskit: An open-source framework for quantum computing, https://qiskit.org/, Last accessed Nov. 1, 2019, 3 pages.

Mel, et al., The NIST Definition of Cloud Computing, National Institute of Standards and Technology Special Publication 800-145, Sep. 2011, 7 Pages.

U.S. Appl. No. 16/671,796, filed Nov. 1, 2019.

Appendix P: IBM Patents or Patent Applications treated as related.

Final Office Action received for U.S. Appl. No. 16/671,796 dated Jan. 10, 2023, 15 pages.

Non Final Office Action received for U.S. Appl. No. 16/671,796 dated Aug. 10, 2022, 33 pages.

Notice of Allowance received for U.S. Appl. No. 16/671,796 dated Mar. 14, 2023, 21 pages.

* cited by examiner

```
┌──────────────────────────────────────────────────────────┐
│ LOADING, BY A SYSTEM OPERATIVELY COUPLED TO A            │─ 502
│ PROCESSOR, A CONTEXT-AWARE DISTRIBUTION LOADING          │
│ SCHEME TO LOAD ARBITRARY RANDOM DISTRIBUTIONS            │
└──────────────────────────────────────────────────────────┘
                              ▼
┌──────────────────────────────────────────────────────────┐
│ PREPARING, BY A SYSTEM OPERATIVELY COUPLED TO A          │─ 504
│ PROCESSOR, A QUANTUM STATE OF A PROBABILITY              │
│ DISTRIBUTION BASED ON STRUCTURE OF A QUANTUM             │
│ AMPLITUDE ESTIMATION ALGORITHM                           │
└──────────────────────────────────────────────────────────┘
                              ▼
┌──────────────────────────────────────────────────────────┐
│ CONSTRUCTING, BY THE SYSTEM, A QUANTUM OPERATOR          │─ 506
│ FOR ARBITRARY COMPUTABLE FUNCTIONS OR STOCHASTIC         │
│ PROCESSES BASED ON THE QUANTUM STATE TO PERFORM          │
│ QUANTUM AMPLITUDE ESTIMATION                             │
└──────────────────────────────────────────────────────────┘
                              ▼
┌──────────────────────────────────────────────────────────┐
│ APPLYING, BY THE SYSTEM, A SINGLE FUNCTIONAL             │─ 508
│ DESCRIPTION TO CONSTRUCT THE QUANTUM STATE USING         │
│ QUANTUM ARITHMETIC FOR NUMERICAL INTEGRATION             │
└──────────────────────────────────────────────────────────┘
                              ▼
┌──────────────────────────────────────────────────────────┐
│ EMPLOYING, BY THE SYSTEM, MULTIPLE OBJECTIVE             │─ 510
│ QUBITS IN CONNECTION WITH SIMPLIFYING OR                 │
│ GENERALIZING A PROBLEM                                   │
└──────────────────────────────────────────────────────────┘
                              ▼
┌──────────────────────────────────────────────────────────┐
│ PREPARING, BY THE SYSTEM, THE QUANTUM STATE OF THE       │
│ PROBABILITY DISTRIBUTION BASED ON STRUCTURE OF THE       │
│ QUANTUM AMPLITUDE ESTIMATION ALGORITHM TO                │─ 412
│ REDUCE COMPUTATIONAL COSTS OF THE PROCESSOR IN           │
│ LOADING ARBITRARY PROBABILITY DENSITY FUNCTIONS          │
│ INTO QUANTUM STATES TO BE USED IN THE QUANTUM            │
│ AMPLITUDE ESTIMATION ALGORITHM EXECUTED ON A             │
│ QUANTUM DEVICE                                           │
└──────────────────────────────────────────────────────────┘
```

FIG. 5

QUANTUM AMPLITUDE ESTIMATION STATE PREPARATION FOR STOCHASTIC PROCESSES

TECHNICAL FIELD

The subject disclosure relates to quantum state preparation, and more specifically, to quantum state preparation of a probability distribution and constructing a quantum operator for stochastic process(es) based on quantum state to facilitate quantum amplitude estimation.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products facilitate generation of efficient artificial intelligence to determine an interaction between drugs and the brain using a brain measure and a brain model.

In accordance to an embodiment, a system, comprises a processor, operatively coupled to a memory, that executes the following computer executable components: a loading component that uses a context-aware distribution loading scheme to load arbitrary random distributions to facilitate preparing a quantum state of a probability distribution based on a structure of a quantum amplitude estimation algorithm; and an operating component that constructs a quantum operator for arbitrary computable functions or stochastic processes based on the quantum state to perform quantum amplitude estimation.

In accordance with an embodiment, a computer implemented method, comprises: using a processor, operatively coupled to a memory, to execute computer executable components to perform the following acts: using the processor to use a context-aware distribution loading scheme to load arbitrary random distributions to facilitate preparing a quantum state of a probability distribution based on a structure of a quantum amplitude estimation algorithm; and constructing, by the processor, a quantum operator for arbitrary computable functions or stochastic processes based on the quantum state to perform quantum amplitude estimation.

DESCRIPTION OF THE DRAWINGS

FIG. 5 illustrates an example flowchart of an implementation of quantum state preparation of a probability distribution and constructing a quantum operator for a stochastic process based on quantum state to facilitate quantum amplitude estimation.

DETAILED DESCRIPTION

Figure 1:
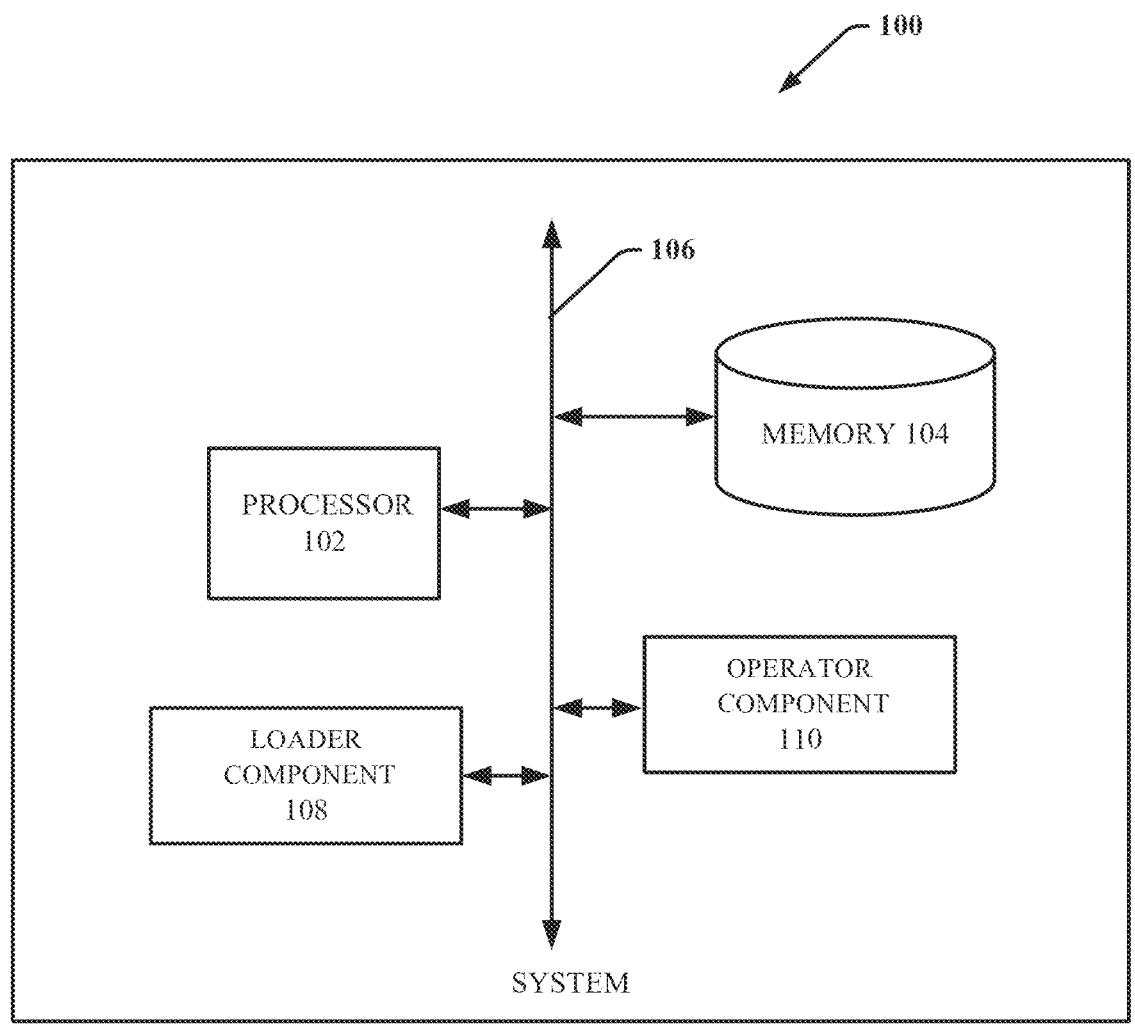
FIG. 1 illustrates a block diagram of an example system implementation that determines a quantum state preparation of a probability distribution and constructs a quantum operator for a stochastic process based on quantum state to facilitate quantum amplitude estimation.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

The subject disclosure relates generally to system(s) and method(s) that uses a context aware distribution loading scheme to load arbitrary random distributions to facilitate preparing a quantum state of a probability distribution based on structure of a quantum amplitude estimation algorithm. A quantum operator is constructed for arbitrary computable functions or stochastic processes based on the quantum state to perform quantum amplitude estimation.

Quantum computing is generally the use of quantum-mechanical phenomena to perform computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, which can entangle multiple quantum bits, and use interference. Quantum computing has the potential to solve problems that, due to their computational complexity, cannot be solved, either for many practical purposes, on a classical computer. However, quantum computing requires very specialized skills to, for example, prepare a quantum state of a probability distribution to perform amplitude estimation.

Quantum amplitude estimation (QAE) is a quantum algorithm that can achieve a quadratic speed-up over classical Monte Carlo simulation. Quantum amplitude estimation has many practical applications such as, for instance, option pricing, risk analysis, numerical integration, and/or another application. In the present context, this means a quantum circuit that consists of a number of gates polynomial in the number of qubits that prepares a quantum state corresponding to a given probability distribution. If state preparation is too expensive (e.g., computationally expensive), it can diminish quantum advantage. Preparing arbitrary quantum states has exponential complexity with respect to number of qubits, and thus, is not applicable. To date, the only known efficient techniques require a distribution to be log-concave or involve learning an unknown distribution from empirical data.

A problem with some existing technologies that can prepare quantum states of distribution is that if a probability distribution is given by an arbitrary probability density function, it cannot efficiently (e.g., with relatively low computational costs) prepare a corresponding state and apply QAE to achieve quantum advantage. Also, arbitrary quantum states have exponential complexity concerning number of qubits (e.g., an exponential number of gates), and thus, not efficient and not applicable since it would diminish quantum advantage. Moreover, some existing technologies that can efficiently (e.g., with relatively low computational costs) prepare quantum states of a distribution have problems wherein it can only be implemented to prepare quantum states corresponding to log-concave distributions (e.g., as opposed to an arbitrary probability distribution for a random variable where the arbitrary probability distribution is given by an arbitrary probability density function). Employing a machine learning model to train a quantum operator to approximate an unknown distribution underlying given historical data is trivial. Another problem with some existing technologies that can efficiently (e.g., with relatively low computational costs) prepare quantum states of distribution is that it is not reversible (e.g., unitary), as it involves taking measurements of the last qubit repeatedly until observing a |1> state. Thus, these embodiments introduce an efficient state preparation technique for arbitrary probability distributions given by a function. This can be achieved by considering context, that is an algorithm applied and leverage its structure, instead of realizing generic state preparation techniques. Thus, the result solves a problem for Quantum Amplitude Estimation and significantly extends applicability of such algorithm. This approach is also extended to stochastic processes by adjusting Grover oracles considering multiple objective qubits.

FIG. 1 illustrates a block diagram of an example system 100 that can access data and process that data using variable computing components depicted in accordance with one or more embodiments described herein. The system 100 provides for a context-aware distribution loading scheme that allows to load arbitrary random distributions efficiently—as long as they are given by a functional description that can be efficiently computed—using quantum arithmetic. This solves a fundamental limitation of Monte Carlo simulation on quantum computers and significantly extends its applicability. It also is more efficient than a Grover-Rudolf approach for log-concave distributions, as it requires only computation of a single function (the target) using quantum arithmetic (instead of repeated quantum arithmetic for numerical integration). Furthermore, this approach can be extended to stochastic processes by adjusting Grover oracles (considering multiple objective qubits).

A significant requirement to apply QAE is efficient data loading; this means a quantum circuit that consists of a number of gates polynomial corresponds in the number of qubits that prepares a quantum state corresponding to a given probability distribution. Preparing generic quantum states requires an exponential number of gates, and thus, is not applicable since it would diminish quantum advantage. Efficient approaches either require a distribution to be log-concave or to leverage quantum machine learning techniques to train a quantum operator to approximate an unknown distribution underlying given historical data. However, if a probability distribution is given by an arbitrary probability density function, it is not clear how to efficiently prepare corresponding state and apply QAE to achieve quantum advantage.

In other settings, such as a Harrow-Hassidim-Lloyd (HHL) algorithm for solving linear systems of equations, it is possible to load arbitrary functions by exploiting measurements and post-selection to realize non-unitary operations. However, in the context of QAE, a state preparation operation should be reversible, which excludes measurements and renders this approach inapplicable.

The system 100 allows to efficiently load arbitrary probability density functions into quantum states to be used in QAE. This is possible by exploiting context, e.g., structure of QAE and thus circumvents lower bounds for generic state preparation. This result resolves a fundamental limitation and significantly extends applicability of QAE to a much larger class of problem.

The system 100 can facilitate a process of assessing and identifying a large amount of various forms of data. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102, operatively coupled to memory 104, that executes computer executable components. The system 100 can further include a system bus 106 that can operatively couple various components including, but not limited to, a loader component 108 that uses a context-aware distribution loading scheme to load arbitrary random distributions to facilitate preparing a quantum state of a probability distribution based on a structure of a quantum amplitude estimation algorithm; and an operating component 110 that constructs a quantum operator for arbitrary computable functions or stochastic processes based on the quantum state to perform quantum amplitude estimation.

In an implementation, the loading component 108 uses a context-aware distribution loading scheme to load arbitrary random distributions to facilitate preparing a quantum state of a probability distribution based on a structure of a quantum amplitude estimation algorithm. It employs a single functional description to construct the quantum state using quantum arithmetic for numerical integration. The operating component 110 constructs a quantum operator for arbitrary computable functions or stochastic processes based on the quantum state to perform quantum amplitude estimation. It employs multiple objective qubits in connection with simplifying or generalizing a problem and adjusts Grover operators to consider the multiple objective qubits. It is to be appreciated that in an implementation the operating component can employ an arbitrary combination of products and sums of functions System 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the systems 100 and/or any other suitable device that can employ information provided by system 100. It is to be appreciated that systems 100, components, models or devices can be equipped with communication components (not shown) that enable communication between the system, components, models, devices, etc. over one or more networks.

The various components of systems 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It may be appreciated that such systems and components can include these components or sub-components specified therein, some of the specified components or sub-components, and/or additional components. Sub-components may also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

Quantum Amplitude Estimation (QAE) is a quantum algorithm that can achieve a quadratic speed-up over classical Monte Carlo simulation. Monte Carlo methods use random sampling to estimate numerical quantities which are hard to compute deterministically. An example is the use in statistical physics of rapidly mixing Markov chains to approximately compute partition functions. In general, the basic core of Monte Carlo methods involves estimating expected output value of a randomized algorithm. Monte Carlo has many possible applications, such as option pricing or risk analysis, or numerical integration.

Figure 2:
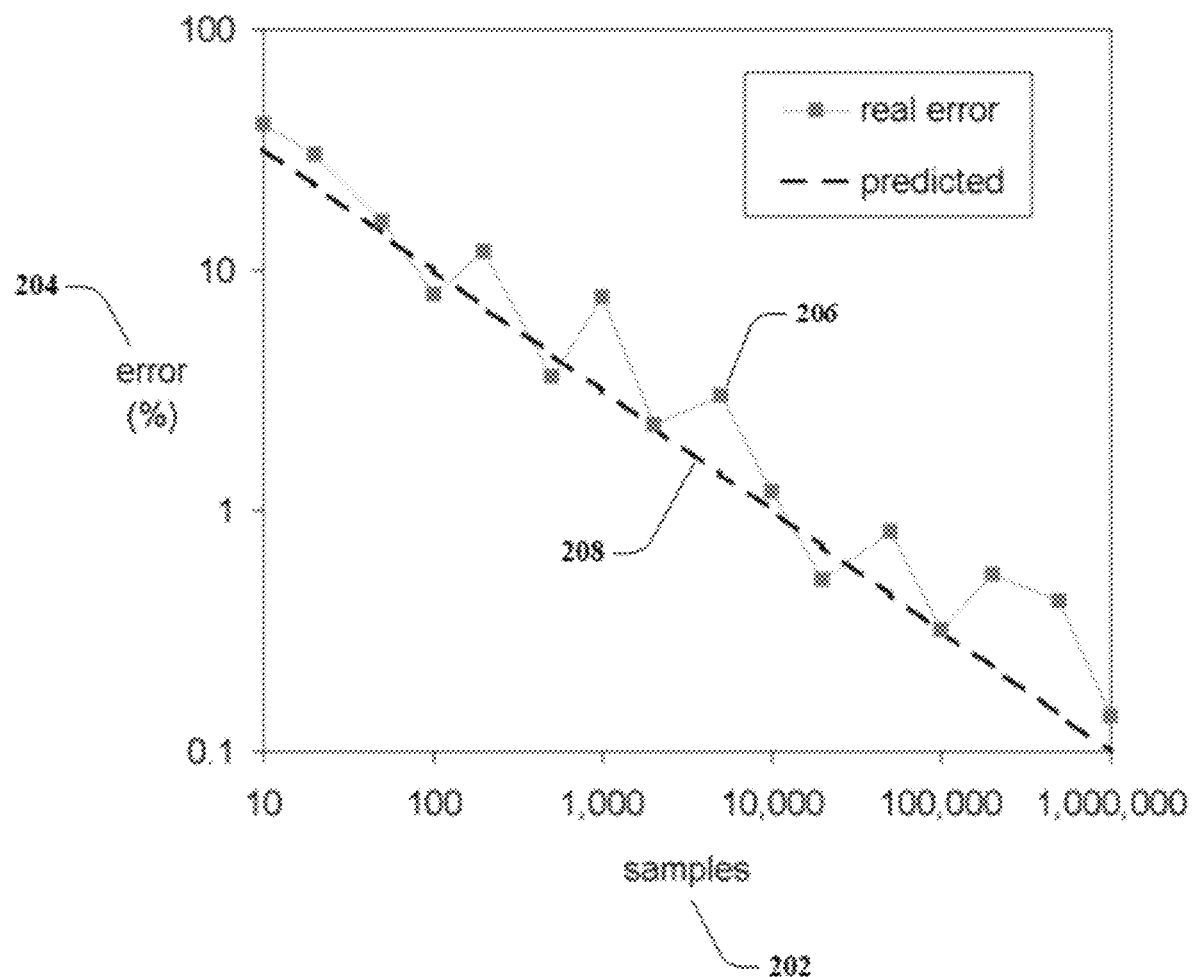
FIG. 2 illustrates an example graph of the Monte-Carlo error reducing method.

FIG. 2 illustrates an example graph of the Monte-Carlo error reducing method. Monte Carlo methods provide a methodology to analyze the exponential increase function in computation time. If the function is well-behaved, it can be estimated by randomly selecting points in N-dimensional space, N being an integer (e.g., 100-dimensional space) and an average of the function values can be taken at these points. If there are sample distributions values as denoted by block 202, error rate percentage is exponentially denoted by block 204. Errors in the Monte-Carlo method denoted by block 206 can be reduced by the square root of a number of samples denoted by block 208. Hence increasing the number of samples by a factor of 100 reduces the maximum error by a factor of 10. Suppose n qubits and a given function $f(x) \geq 0$ for $x=0, \ldots, 2^n-1$. A quantum circuit U is found in a polynomial n such that (up to normalization)

$$U: |0\rangle_n \mapsto \sum_x \sqrt{f(x)} |x\rangle_n =: |\psi\rangle$$

to be used in Quantum Amplitude Estimation. A proposition state $\psi$ is prepared that corresponds to a function f (probability distribution function f) and numerical integration can be performed with this function.

Figure 3:
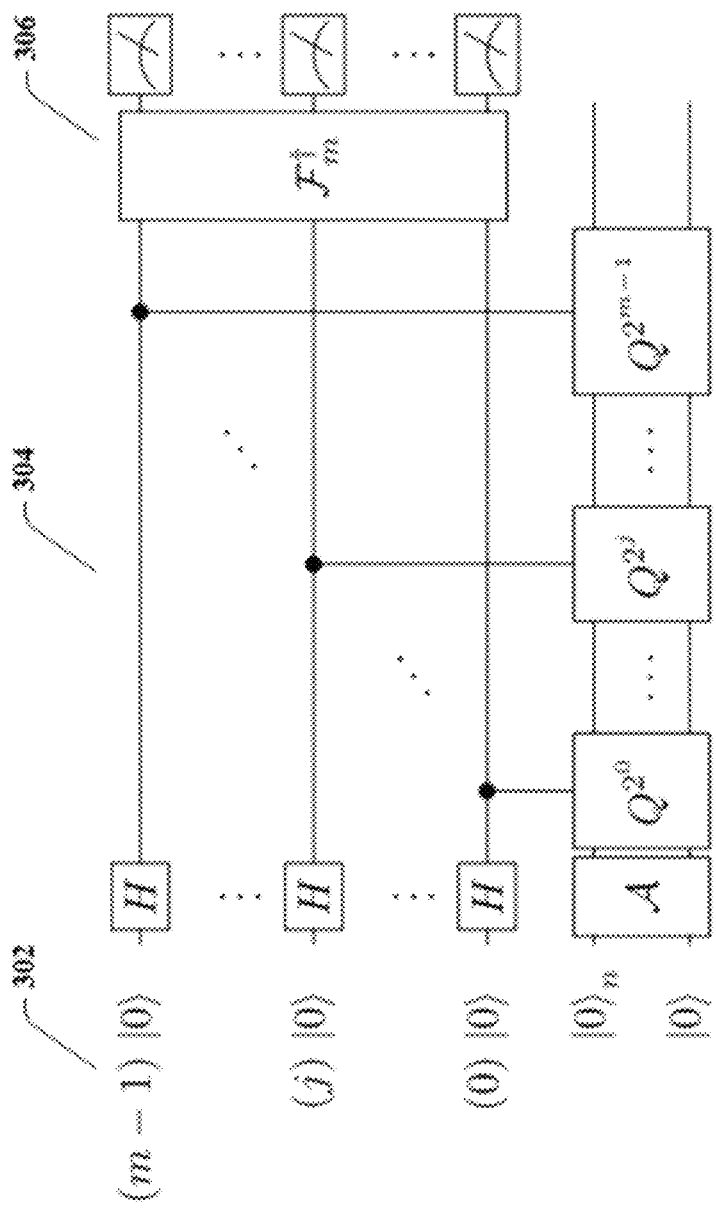
FIG. 3 illustrates an example graph of a Quantum phase estimation circuit.

FIG. 3 illustrates an example of a Quantum phase estimation circuit. This Quantum amplitude estimation (QAE) exploits superposition as denoted by block 302. The entanglement properties as denoted by block 304 handles random distributions directly, instead of only sampling from the distributions. It demonstrates how quantum computing can be used to quadratically speed-up simulation and extract estimation as denoted by block 306. This cannot be achieved by classical Monte Carlo and represents the start of a new avenue of research to find quantum advantage in applications exploiting simulation such as finance. If there is an operator f, then an operator A can be constructed such that it constructs A. The quantum circuit corresponding to the Quantum Amplitude Estimation algorithm with the inverse Quantum Fourier Transform is being denoted by $F^\dagger m$. The algorithm requires m additional evaluation qubits that control the applications of an operator. More precisely, evaluation bit $j=0, \ldots, m-1$ controls operator $Q^{2^j}$. Eventually, the error in the outcome scales with $\epsilon \propto \frac{1}{2^m}$, which corresponds to a quadratic speed-up compared to the classical Monte Carlo simulation.

Based on U and for a given $g(x) \in [0, 1]$, construct a reversible operator A, such that:

$$A: |0\rangle_n |0\rangle \mapsto \sum_x \sqrt{f(x)} |x\rangle_n \left(\sqrt{1-g(x)} |0\rangle + \sqrt{g(x)} |1\rangle\right)$$

This is the proposition of possible x values. f(x) is the amplitude for x and g(x) can be applied to another qubit such that the amplitude of 1 in the last peninsula is square root of g(x). This is also a property that depends on x. These terms are collected to measure the probability of 1 in the last qubit, then this corresponds to the expected value of g (x):

$$\mathbb{P}[|1\rangle] = \sum_x f(x)g(x) = \mathbb{E}_f[g(X)]$$

where x is a random variable that corresponds to the distribution of f. Amplitude estimation allows estimating the probability of |1> in the last qubit with a quadratic speed-up compared to classical Monte Carlo simulation. If X is a random variable corresponding to f, this example can be used to estimate the expected value as shown in the equation above. If the construction of operator U is determined, then it would construct f and thus operator A which gives the state that corresponds to the expected value. Amplitude estimation can be used to estimate this value with the quadratic speedup compared to classical Monte Carlo simulation. This analogy determines how to construct the operator that gives f for a subset of distributions however, the problem is to determine how to construct for generic function f.

Suppose a stochastic process is given by initial probability distribution $f_0(x_0)$ and the transition probabilities $f_t(x_{t+1}, x_t)$.

Similar to before, the goal is to prepare a quantum state corresponding to the joint probability distribution of $x_t$, $t=0, \ldots, T$, such that it can exploit it in QAE. $f_0$ is a probability distribution over an initial state and transition probability for time stamp t. For every state $x_t$, the probability of being in the next state $x_{t+1}$ can be determined. If an operator like U is constructed before $x_t$ then it can only be done in limited cases and not for generic functions. In the current state of the art, these operations are used in loading Log-Concave polynomial distribution. Also, it is used in generic lower bounds for exponential state preparation wherein this method is expensive compare to a classical methodology. Lastly, QGANs learn from historical data using polynomial approximation where QGANs is a machine learning approach where the distribution approximation can be determined only with the help of historical data. These techniques are also used in the literate where the state can be prepared with measurements wherein the state is shown in the following form:

$$\frac{1}{\sqrt{2^n}} \sum_{x=0}^{2^n-1} |x\rangle_n \left( \sqrt{1-f(x)} |0\rangle + \sqrt{f(x)} |1\rangle \right)$$

which is the proposition of x values and then a rotation on angular qubit such that the average of the 1 corresponds to the f(x) would now measure the last qubit. In simple terms, this method is repeated until observing a |1> for the last qubit, thus with the resulting state |ψ>. However, this measurement is not reversible. In principle, this would be a technique that gives the state that is expected but this is not reversible/unitary. It is not compatible with the algorithm that is determined to be applied. For a state preparation in QAE, this needs to be reversible. Hence, this is not applicable for Quantum Amplitude Estimation.

Current distribution loading schemes aim at preparing state |ψ> without taking into account context of where it is used, e.g., Quantum Amplitude Estimation. In these embodiments, a new technique is introduced that allows to efficiently load arbitrary probability density functions into quantum states to be used in QAE. This is possible by exploiting the context, e.g., the structure of QAE and thus circumvents the lower bounds for generic state preparation. This result resolves a limitation and significantly extends the applicability of QAE to a much larger class of problems. Suppose a given operator A acting on n+1 qubits as:

$$\mathcal{A}|0\rangle_n|0\rangle = \sqrt{1-a}\,|\psi_0\rangle_n|0\rangle + \sqrt{a}\,|\psi_1\rangle_n|1\rangle$$

where $|\psi_0\rangle$, $|\psi_1\rangle$ are normalized quantum states, and a $\in[0, 1]$ is the probability of measuring the last qubit in state |1>. The states with |1> in the last qubit are good states, and the others are bad states. Then, QAE allows to estimate $\alpha$ with a quadratic speed-up over classical Monte Carlo simulation. To this extent, QAE repeatedly applies the operator $Q=AS_0A^\dagger S_{\psi 0}$ to $A|0\rangle_{n+1}$ and the resulting error scales as O (1/M), where M denotes the number of (quantum) samples, e.g., applications of Q. For classical Monte Carlo simulation the error scales as $O(1/\sqrt{M})$ for M (classical) samples, e.g., QAE achieves a quadratic speed-up.

Here $S_0=I-2|0\rangle\langle 0|_{n+1}$ and $S_{\psi 0}=I-2\,|\psi_0\rangle\langle\psi_0|<0|$ are reflections, and I is the identity operator. Due to the definition of A in the equation above, $S_{\psi 0}$ can be easily constructed by only considering the ancilla qubit. Note that the original formulation of QAE does not require good states and bad states to be flagged by an ancilla qubit but is more generic. In general, it may be more complex to implement the reflection $S_{\psi 0}$ but the underlying theory holds as well. This can be leveraged later, where the good states and bad states can be flagged using an encoding of multiple ancilla qubits. The canonical QAE is based on Quantum Phase Estimation (QPE), which introduces an overhead in terms of the number of required qubits and circuit depth. Recently, other variants of QAE have been developed that can achieve a quadratic speedup without QPE. To apply these algorithms to a more generic problem, not only $S_{\psi 0}$ needs to be adjusted to identify good states and bad states, but it is also required that it can identify from a single measurement of qubits, whether it is observed part of a good state or not. Using an encoding of multiple ancilla qubits satisfies this requirement. A common way to construct A is to first load a probability distribution and then apply an objective function, as outlined in the following. Assume n qubits, a random variables X defined by the possible values $x_i=a\cdot i+b$, where a, b$\in$R, and the corresponding probabilities $p_i\in[0, 1]$, for $i=0, \ldots, 2^n-1$, and a quantum operator u acting as:

$$\mathcal{U}|0\rangle_n = \sum_{i=0}^{2^n-1} \sqrt{p_i}\,|i\rangle_n$$

Furthermore, suppose an objective function g: R→[0, 1], one additional qubit in state |0>, and a corresponding quantum operator G defined by:

$$\mathcal{G}: |i\rangle_n|0\rangle \mapsto |i\rangle_n \left( \sqrt{1-g(x_i)}\,|0\rangle + \sqrt{g(x_i)}\,|1\rangle \right)$$

If A=G(u⊗I), then the probability of measuring |1 in the last qubit is given by:

$$\sum_{i=0}^{2^n-1} p_i g(x_i)$$

which is equal to the expected value E[g(X)]. Thus, if u and G are constructed efficiently, a quadratic speed-up is achieved to estimate E[g(X)] by using QAE for A. For more general functions, G can be constructed using quantum arithmetic, by first computing $$\sin^{-1}\left(\sqrt{g(x_i)}\right)$$

into an ancilla qubit register and then using controlled Y-rotations to prepare amplitude of the ancilla qubit. However, constructing u is more challenging, and in general requires an exponential number of gates. Thus, these embodiments show an alternative approach that allows to efficiently construct A whenever the probabilities $p_i$ and g are given by an efficiently computable function. These embodiments also show how this extends to multivariate problems as well as stochastic processes.

Figure 4:
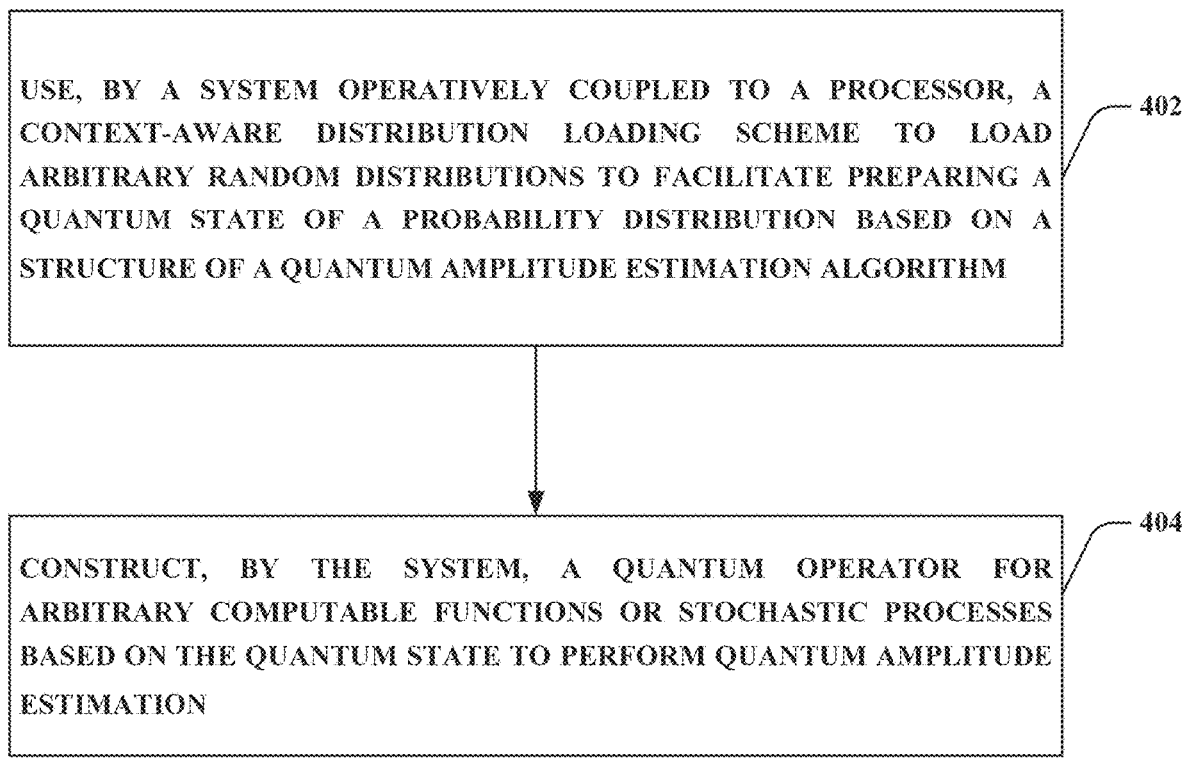
FIG. 4 illustrates an example flowchart of an implementation of quantum state preparation of a probability distribution and constructing a quantum operator for a stochastic process based on quantum state to facilitate quantum amplitude estimation.

FIG. 4 illustrates an example flowchart in accordance with a non-limiting implementation. At 402, the methodology uses, by a system (e.g., system 100) operatively coupled to a processor (e.g., processor 102), a context-aware distribution loading scheme to load arbitrary random distributions to facilitate preparing a quantum state of a probability distribution based on a structure of a quantum amplitude estimation algorithm. At 404, the methodology constructs, by the system, a quantum operator for arbitrary computable functions or stochastic processes based on the quantum state to perform quantum amplitude estimation.

The methodology provides for a context-aware distribution loading scheme that allows to load arbitrary random distributions efficiently—as long as they are given by a functional description that can be efficiently computed—using quantum arithmetic. This solves a fundamental limitation of Monte Carlo simulation on quantum computers and significantly extends its applicability. It also is more efficient than a Grover-Rudolf approach for log-concave distributions, as it requires only computation of a single function (the target) using quantum arithmetic (instead of repeated quantum arithmetic for numerical integration). Furthermore, this approach can be extended to stochastic processes by adjusting Grover oracles (considering multiple objective qubits).

FIG. 5 illustrates an example flowchart of an efficient state preparation technique for arbitrary probability distributions given by a function. The flow chart illustrates a non-limiting computer-implemented method that can facilitate loading a context-aware distribution loading scheme to load arbitrary random distributions as denoted by block 502. A quantum state is prepared of a probability distribution based on the structure of a quantum amplitude estimation algorithm as denoted by block 504. A quantum operator is constructed for arbitrary computable functions or stochastic processes based on the quantum state to perform quantum amplitude estimation as denoted by block 506. A single functional description is applied to construct the quantum state using quantum arithmetic for numerical integration as denoted by block 508. These embodiments employ multiple objective qubits in connection with simplifying or generalizing a problem as denoted by block 510. The quantum state of the probability distribution is prepared based on the structure of the quantum amplitude estimation algorithm to reduce computational costs of the processor in loading arbitrary probability density functions into quantum states to be used in the quantum amplitude estimation algorithm executed on a quantum device as denoted by block 412. For instance, the simple case where $p_i = 1/2^n$, e.g., where X follows a uniform distribution. This is easy to prepare by applying Hadamard gates to n state qubits. Then, applying G, defined as before, leads to the state:

$$\frac{1}{\sqrt{2^n}} \sum_{i=0}^{2^n-1} |i\rangle_n \left( \sqrt{1-g(x_i)} |0\rangle + \sqrt{g(x_i)} |1\rangle \right)$$

with the probability of measuring $|1\rangle$ in the ancilla qubit being equal to:

$$\frac{1}{\sqrt{2^n}} \sum_{i=0}^{2^n-1} g(x_i).$$

This is already sufficient to estimate the integral of f using QAE. Depending on how $x_i$ is chosen, this can be used e.g. to realize the left/right Riemann sum or the Midpoint rule for numerical integration. The state that is shown here is prepared using quantum arithmetic. One qubit is measured and collapsed to the state of interest. If this state is applied to QAE and measure the probability of 1 in the last qubit then the sum is shown above. This is a sum of overall points $x_i$ where the integration of f for the points $x_i$ is performed and divided by $1/2^n$ points. This is a simple estimation for numerical integration. This can be interpreted as a left Riemann sum, e.g., a 2 n-point approximation of the integral:

$$\int_{x=0}^{1} g(x) dx.$$

assuming $x_i = i/2^n$. Suppose X is defined by a probability density function (PDF) f: $R \rightarrow R_{\geq 0}$, then it can replace g by the product of f and g, which allows approximating the expectation value $E_f[g(X)]$. Depending on f, it may need to normalize the problem such that $f(x)g(x) \in [0, 1]$ for x values. In the following, an alternative way to introduce is to estimate $E[g(X)]$, which can easily be extended to stochastic processes. Suppose a random variable $X \in [0, 1]$ and the corresponding (normalized) probability density function f: $R \rightarrow [0, 1]$. Furthermore, suppose n state qubits and two ancilla qubits. The operators F and G can be prepared such that:

$$\mathcal{F}: |i\rangle_n |0\rangle \mapsto$$
$$|i\rangle_n \left( \sqrt{1-f(x_i)} |0\rangle + \sqrt{f(x_i)} |1\rangle \right) |j\rangle$$

and $$\mathcal{G}: |i\rangle_n |j\rangle |0\rangle \mapsto$$
$$|i\rangle_n |j\rangle \left( \sqrt{1-g(x_i)} |0\rangle + \sqrt{g(x_i)} |1\rangle \right)$$

where F prepares the first ancilla qubit and G prepares the second one. Hadamard gates can be applied to the first n qubits followed by F and G, which leads to the state:

$$\frac{1}{\sqrt{2^n}} \sum_{i=0}^{2^n-1} |i\rangle_n \sqrt{1-f(x_i)} \sqrt{1-g(x_i)} |00\rangle +$$

$$\frac{1}{\sqrt{2^n}} \sum_{i=0}^{2^n-1} |i\rangle_n \sqrt{1-f(x_i)} \sqrt{g(x_i)} |01\rangle +$$

$$\frac{1}{\sqrt{2^n}} \sum_{i=0}^{2^n-1} |i\rangle_n \sqrt{f(x_i)} \sqrt{1-g(x_i)} |10\rangle +$$

$$\frac{1}{\sqrt{2^n}} \sum_{i=0}^{2^n-1} |i\rangle_n \sqrt{f(x_i)} \sqrt{g(x_i)} |11\rangle.$$

Then, the probability of measuring $|11\rangle$ for the last two qubits is given by:

$$\frac{1}{\sqrt{2^n}} \sum_{i=0}^{2^n-1} f(x_i) g(x_i)$$

which again is equal to a Riemann sum and approximates the expected value $E_f[g(X)]$. In this case, $S_{\psi 0} = I - 2|\psi 0\rangle |00\rangle \langle \psi 0| \langle 00|$ is defined to construct Q, e.g., good states and bad states can be identified by the two ancilla qubits and it does not have to explicitly multiply f and g using quantum arithmetic. Similar to multiplication, it can also construct operators to realize the addition of functions. Suppose the operators F and G as before, but now, it can not only share the control qubits but also the target qubit. Furthermore, it can add an ancilla qubit in state |0⟩ and consider the initial state $|i\rangle_n |0\rangle |0\rangle$. Applying a Hadamard gate to the ancilla and then the two (controlled) operators:

$$F \otimes |0\rangle\langle 0| \otimes I + I_{n+1} |1\rangle\langle 1|$$

$$G \otimes |1\rangle\langle 1| \otimes I + I_{n+1} |0\rangle\langle 0|$$

leads to the state:

$$\frac{1}{\sqrt{2}} |i\rangle_n \left(\sqrt{1-f(x_i)}|0\rangle + \sqrt{f(x_i)}|1\rangle\right)|0\rangle +$$

$$\frac{1}{\sqrt{2}} |i\rangle_n \left(\sqrt{1-g(x_i)}|0\rangle \sqrt{g(x_i)}|1\rangle\right)|1\rangle$$

Applying another Hadamard gate to the ancilla qubit implies the state:

$$\frac{1}{2}(\sqrt{1-f(x_i)}\sqrt{1-g(x_i)}|i\rangle_n|0\rangle|0\rangle + \frac{1}{2}(\sqrt{1-f(x_i)}\sqrt{1-g(x_i)}|i\rangle_n|0\rangle|1\rangle$$

$$+ \frac{1}{2}(\sqrt{1-f(x_i)}\sqrt{g(x_i)}|i\rangle_n|1\rangle|0\rangle + \frac{1}{2}(\sqrt{f(x_i)}\sqrt{g(x_i)}|i\rangle_n|1\rangle|1\rangle.$$

If the good states are defined again as those with |1⟩ in the target qubit, e.g., the second last qubit, then the probability of measuring these states equals f(x_i)+g(x_i), e.g., it can add the functions f and g. This construction is closely related to a technique called Linear Combination of Unitaries (LCU). However, LCU requires the ancilla qubit to be measured in a particular state to get the desired (non-unitary) operation. In the present context, this is not necessary since it can adjust $S_{\psi 0}$ accordingly within QAE. Exploiting the presented approach, arbitrary combinations of additions and multiplications of functions can be constructed for which have oracles of the form given for F and G. In case an addition takes place after one or more multiplications, e.g., in a situation where the good states are flagged by multiple ancilla qubits being in state |1⟩, it might be necessary to add ancilla qubit, and apply a multi-controlled NOT gate to reduce back to a single qubit flagging the good states. It is to be noted that QAE can be easily adjusted such that it measures the probability of two states being 1 instead of only 1. That just needs adjustment of one of the reflections defining the underlying Grover operator. In these embodiments, the function may not have to be a probability distribution function. It can be any function and it can be normalized to either 0 and 1. The product of two functions is showed above, however a sum of two functions f and g where f(g(x)+h(x)) can be performed as well where g and h are two arbitrary functions. If instead of functions f and g, the (transition) probability functions defining a stochastic process can be considered, wherein the process can be repeated T+1 time and thus generate a state:

$$\frac{1}{\sqrt{2^n}} \sum_{i_0=0}^{2^{n_0}-1} \cdots \sum_{i_T=0}^{2^{n_T}-1} |i_0\rangle_{n_0} \cdots |i_T\rangle_{n_t}$$

$$\left[\cdots + \sqrt{f_0(x_{i_0}^0)\prod_{t=1}^{T}f_t(x_{i_t}^t \mid x_{i_{t-1}}^{t-1})}|1 \cdots 1\rangle_{T+1}\right]$$

This is extended to a stochastic process if a state has to be constructed that corresponds to products of functions. The equation above sums from $i_0$ to $i_T$ where it has t+1 sum wherein for every timestamp, it can go through many possible stages. Then there is qubit resistance for $i_0$ $n_0$ to $i_t$ $n_T$. This means that the first resistance is representing the state at time 0 and the last resistance is representing at state time t and in between states are represented by the resistances in-between. There might be a different number of qubits for every time-stamp. The probability for a particular process defined in this stochastic process is given by the equation represented in the square root. If $f_0$ $(x_{io}^0)$ is the probability of being in state $x_{i0}$ at time stamp 0 and 1, then that corresponds to the time-stamp $i_1$ and the probability to be there is given by $x_{io}^0$ with $f_t$=1, where $x_{it}$ or $x_{i1}$ given $x_{i0}$ and probability to be in stage $x_2$ and many more. When the last ancilla qubit is added and applied a controlled Y-rotation to an objective function g as before, then the probability of measuring is in last (T+2) qubits (T+1 for the stochastic model+1 for the objective function) is given by:

$$\frac{1}{2^n} \sum_{i_0,\ldots,i_T} f_0(x_{i_0}^0) \prod_{t=1}^{T} f_t(x_{i_t}^t \mid x_{i_{t-1}}^{t-1}) g(x_{i_0}^0, \ldots, x_{i_T}^T)$$

which corresponds to the expected value E[g(X)] where X=(x⁰, . . . x^T) e.g., the random variables corresponding to the possible paths of the considered stochastic process. As before, the Grover operator in QAE can be easily adjusted to consider (T+2) objective qubits. Thus, these embodiments load arbitrary functions of complex stochastic processes by considering the context and by not naively preparing these functions. Earlier there was a quadratic restriction that can a stochastic process can be considered, wherein the process can be repeated T+1 time and thus generate a state:

$$\frac{1}{\sqrt{2^n}} \sum_{i_0=0}^{2^{n_0}-1} \cdots \sum_{i_T=0}^{2^{n_T}-1} |i_0\rangle_{n_0} \cdots |i_T\rangle_{n_t}$$

$$\left[\cdots + \sqrt{f_0(x_{i_0}^0)\prod_{t=1}^{T}f_t(x_{i_t}^t \mid x_{i_{t-1}}^{t-1})}|1 \cdots 1\rangle_{T+1}\right]$$

This is extended to a stochastic process if a state has to be constructed that corresponds to products of functions. The equation above sums from $i_0$ to $i_T$ where it has t+1 sum wherein for every timestamp, it can go through many possible stages. Then there is qubit resistance for $i_0$ $n_0$ to $i_t$ $n_T$. This means that the first resistance is representing the state at time 0 and the last resistance is representing at state time t and in between states are represented by the resistances in-between. There might be a different number of qubits for every time-stamp. The probability for a particular process defined in this stochastic process is given by the equation represented in the square root. If $f_0$ $(x_{io}^0)$ is the probability of being in state $x_{io}^0$ at time stamp 0 and 1, then that corresponds to the time-stamp ii and the probability to be there is given by $x_{io}^0$ with $f_t$=1, where $x_{it}$ or $x_{i1}$ given $x_{i0}$ and probability to be in stage $x_2$ and many more. When the last ancilla qubit is added and applied a controlled Y-rotation to an objective function g as before, then the probability of measuring is in last (T+2) qubits (T+1 for the stochastic model+1 for the objective function is given by:

$$\frac{1}{2^n} \sum_{i_0,\ldots,i_T} f_0(x_{i_0}^0) \prod_{t=1}^{T} f_t(x_{i_t}^t \mid x_{i_{t-1}}^{t-1}) g(x_{i_0}^0, \ldots, x_{i_T}^T)$$

which corresponds to the expected value E[g(X)] where $X=(x^0, \ldots x^T)$ e.g., the random variables corresponding to the possible paths of the considered stochastic process. As before, the Grover operator in QAE can be easily adjusted to consider (T+2) objective qubits. Thus, these embodiments load arbitrary functions of complex stochastic processes by considering the context and by not naively preparing these functions. Earlier there was a quadratic restriction that can only apply to efficiently loadable distributions and this limitation is eliminated in these embodiments. This works for complex distributions and thus provide an efficient solution.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 6:
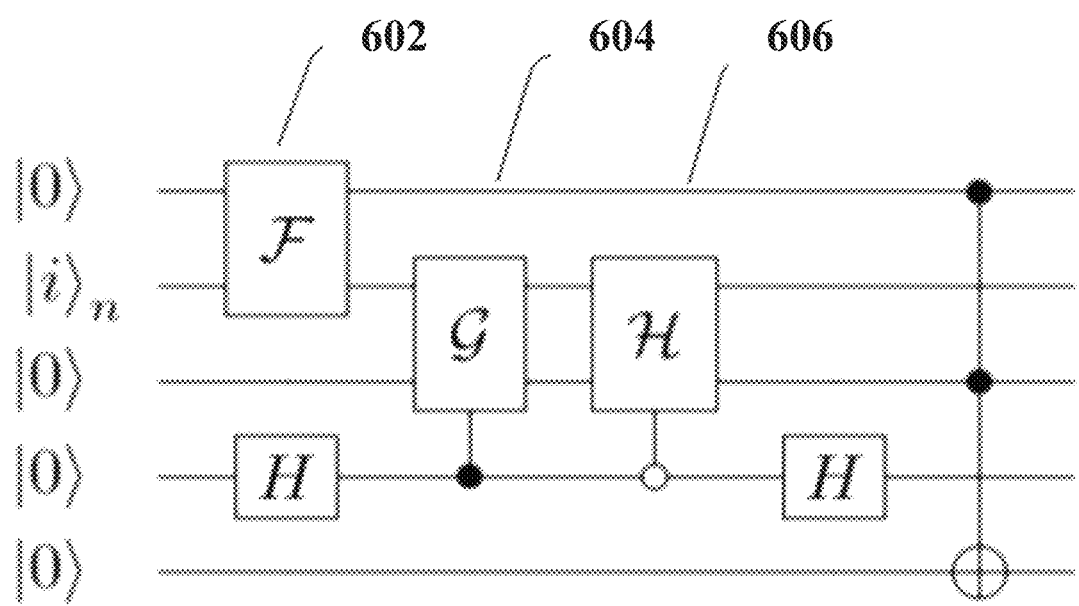
FIG. 6 illustrates an example graph of functions addition and multiplication of amplitudes for Quantum Amplitude Estimation.

FIG. 6 illustrates an example graph of functions addition and multiplication of amplitudes for Quantum Amplitude Estimation. In the corresponding circuit illustrated in this figure, functions f, g, h and the corresponding operators F, G, H, are denoted by blocks 602, 604 and 606. These functions share the control qubits $|i\rangle_n$, but with the difference that F targets the qubit above $|i\rangle_n$ and the other two operators the qubit below $|i\rangle_n$. Then the illustrated circuit prepares a state with the probability of measuring the bottom qubit in state $|1\rangle$ equal to $f(x_i)(g(x_i)+h(x_i))$. A Toffoli gate is necessary in case another function needs to be added, otherwise, adjusting $S_{\psi 0}$ is sufficient. Thus far, the focus was mainly on univariate problems. It is straight-forward to extend this approach to multivariate problems as well, e.g., by representing the dimensions by separate quantum registers, possibly with a different number of qubits. The required number of qubits can scale linearly in the dimension, unlike classical numerical integration schemes where the dependence is usually exponential, except for Monte Carlo simulation. In these embodiments, this approach can be extended to load stochastic processes as well. Suppose a stochastic process is given by an initial probability distribution $f_0(x_0)$ and the transition probabilities $f_t(x^t|x^{t-1})$, e.g., the probability to reach state $x^t$ at time t, given the state history $x^{t-1}$. Here, to simplify the notation, it can be assumed that Markov processes, e.g., $f_t$ only depends on $x^t$ and $x^{t-1}$, not the full history of the process. However, it is straight-forward to extend our approach to generic (discretized) stochastic processes. Furthermore, suppose $n_t$ qubits to represent the state $x^t$ at time t, for t=0, ... T, add T+1 ancilla qubits, and define $n=n_0+\ldots+n_T$. Then, as before, it can construct an operator $F_0$ corresponding to $f_0$ that prepares the first ancilla qubit. In addition, operators can be constructed:

$$\mathcal{F}_t: |i\rangle_{n_{t-1}} |j\rangle_{n_t} |0\rangle \mapsto$$

$$|i\rangle_{n_{t-1}} |j\rangle_{n_t}$$

$$\left( \sqrt{1 - f_t(x_j^t \mid x_i^{t-1})} |0\rangle + \sqrt{f_t(x_j^t \mid x_i^{t-1})} |1\rangle \right)$$

If Hadamard gates is applied to state qubits and then apply $F_0, \ldots, F_T$ to the right qubit registers and ancilla qubits, it can construct the (n+T+1) qubit state:

$$\frac{1}{\sqrt{2^n}} \sum_{i_0=0}^{2^{n_0}-1} \cdots \sum_{i_T=0}^{2^{n_T}-1} |i_0\rangle_{n_0} \cdots |i_T\rangle_{n_T}$$

$$\left[ \ldots + \sqrt{f_0(x_{i_0}^0) \prod_{t=1}^{T} f_t(x_{i_t}^t \mid x_{i_{t-1}}^{t-1})} |1 \ldots 1\rangle_{T+1} \right]$$

where the terms are dropped without $|1 \ldots 1\rangle_{T+1}$ in the ancilla qubits. Given an objective function g: $R^{T+1} \to [0, 1]$ and the corresponding operator G, another ancilla qubit can be added and apply G. The resulting probability of measuring $|1 \ldots 1\rangle_{T+2}$ in ancilla qubits is then given by:

$$\frac{1}{2^n} \sum_{i_0,\ldots,i_T} f_0(x_{i_0}^0) \prod_{t=1}^{T} f_t(x_{i_t}^t \mid x_{i_{t-1}}^{t-1}) g(x_{i_0}^0, \ldots, x_{i_T}^T)$$

which approximates the expectation value E[g(X)] where $X=(x^0, \ldots x^T)$ represents the possible paths of the (discretized) stochastic process defined by the functions $f_t$. Note that the complexity of implementing $S_{\psi 0}$ essentially scales like a multi-controlled NOT gates. Thus, its gate complexity is less than the complexity of $S_0$, which corresponds to multi-controlled NOT gate that is controlled by many but one qubit (ignoring work qubits that are used and then cleaned within the construction of A, e.g., to realize quantum arithmetic).

These embodiments achieve a quadratic speedup numerical integration and estimating expected values for efficiently computable (products of) functions and (discrete-time) stochastic processes and thus solve the limitations of QAE. Moreover, the applicability of this approach is quite universal, thus, the impact might be huge. However, it probably requires fault-tolerant quantum computers, thus, it can still employ a while to be realized. In the short-term, these embodiments help to identify possible applications of QAE with the heavy long-term impact due to the universality of QAE. Thus, these embodiments provide a context-aware distribution loading scheme which allows loading arbitrary random distributions efficiently provided by a functional description that can be efficiently computed using quantum arithmetic. Also, it solves a fundamental limitation of Monte Carlo simulation on quantum computers and significantly extends its applicability. It is more efficient than a Grover-Rudolf approach for log-concave distributions, as it requires only the computation of a single function (the target) using quantum arithmetic (instead of repeated quantum arithmetic for numerical integration). Furthermore, these embodiments show how to extend this approach to stochastic processes by adjusting the Grover oracles (considering multiple objective qubits).

Figure 7:
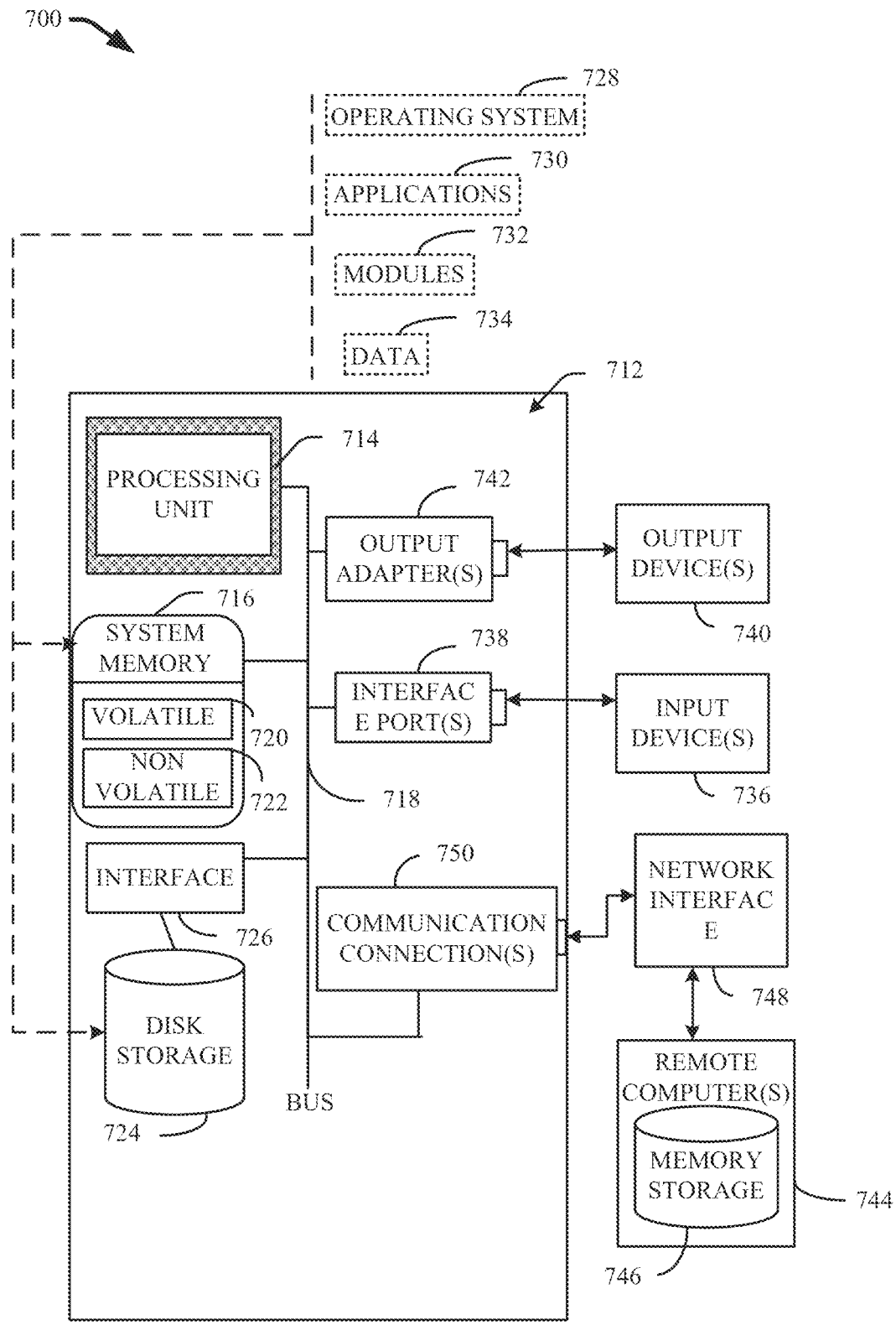
FIG. 7 illustrates a block diagram of an example, non-limiting operating environment in which one or more embodiments described herein can be facilitated.

In order to provide a context for the various aspects of the disclosed subject matter, FIG. 7 as well as the following discussion are intended to provide a general description of a suitable environment in which the various aspects of the disclosed subject matter can be implemented. FIG. 7 illustrates a block diagram of an example, non-limiting operating environment in which one or more embodiments described herein can be facilitated. Repetitive description of like elements employed in other embodiments described herein is omitted for sake of brevity.

With reference to FIG. 7, a suitable operating environment 700 for implementing various aspects of this disclosure can also include a computer 712. The computer 712 can also include a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714. The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 716 can also include volatile memory 720 and non-volatile memory 722. The basic input/output system (BIOS), containing the basic routines to transfer information between elements within the computer 712, such as during start-up, is stored in non-volatile memory 722. Computer 712 can also include removable/non-removable, volatile/non-volatile computer storage media. FIG. 7 illustrates, for example, a disk storage 724. Disk storage 724 can also include, but is not limited to, devices like a magnetic disk drive, floppy disk drive, tape drive, Jaz drive, Zip drive, LS-100 drive, flash memory card, or memory stick. The disk storage 724 also can include storage media separately or in combination with other storage media. To facilitate connection of the disk storage 724 to the system bus 718, a removable or non-removable interface is typically used, such as interface 726. FIG. 7 also depicts software that acts as an intermediary between users and the basic computer resources described in the suitable operating environment 700. Such software can also include, for example, an operating system 728. Operating system 728, which can be stored on disk storage 724, acts to control and allocate resources of the computer 712.

System applications 730 take advantage of the management of resources by operating system 728 through program modules 732 and program data 734, e.g., stored either in system memory 716 or on disk storage 724. It is to be appreciated that this disclosure can be implemented with various operating systems or combinations of operating systems. A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port can be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a computer, a server, a router, a network PC, a workstation, a microprocessor-based appliance, a peer device or other common network node and the like, and typically can also include many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 750 refers to the hardware/software employed to connect the network interface 748 to the system bus 718. While communication connection 750 is shown for illustrative clarity inside computer 712, it can also be external to computer 712. The hardware/software for connection to the network interface 748 can also include, for exemplary purposes only, internal and external technologies such as, modems including regular telephone grade modems, cable modems and DSL modems, ISDN adapters, and Ethernet cards.

Figure 8:
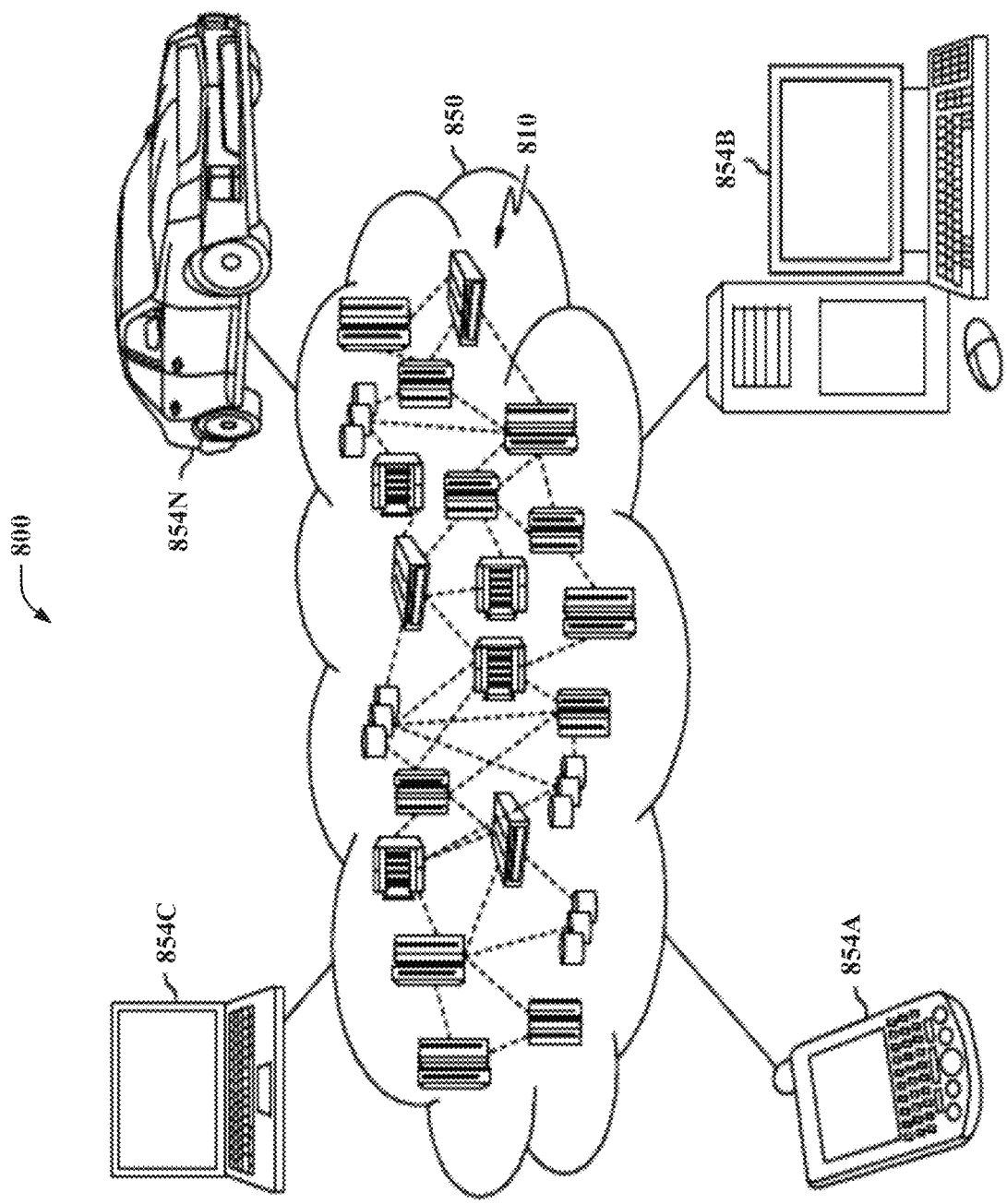
FIG. 8 illustrates a block diagram of an example, non-limiting cloud computing environment in accordance with one or more embodiments of the subject disclosure.

Referring now to FIG. 8, a drawing 800 is shown. Drawing 800 depicts an illustrative cloud computing environment 850. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Although not illustrated in FIG. 8, cloud computing nodes 810 can further comprise a quantum platform (e.g., quantum computer, quantum hardware, quantum software, etc.) with which local computing devices used by cloud consumers can communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
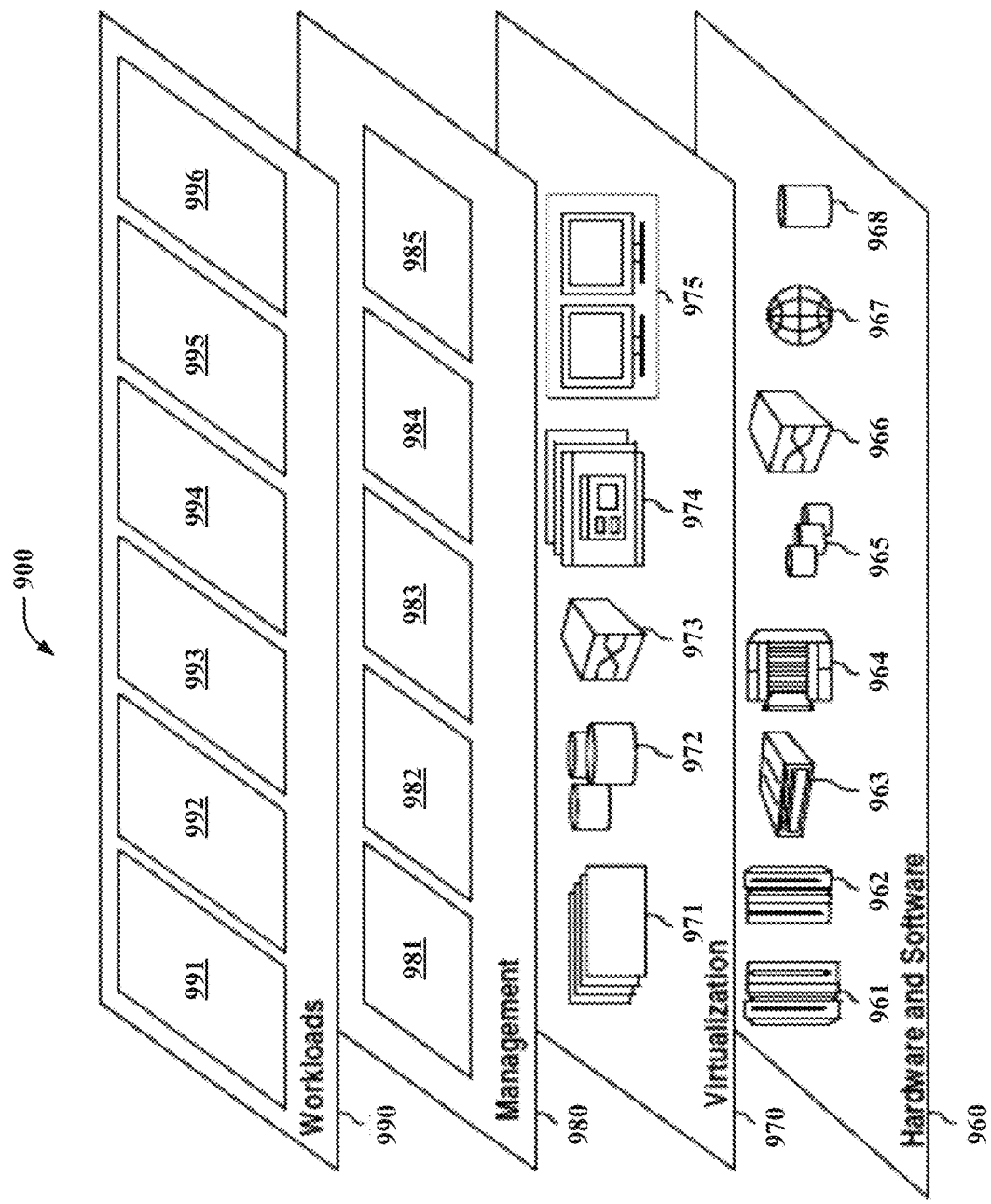
FIG. 9 illustrates a block diagram of example, non-limiting abstraction model layers in accordance with one or more embodiments of the subject disclosure.

Referring now to FIG. 9, a drawing 900 is shown. Drawing 900 depicts a set of functional abstraction layers provided by cloud computing environment 850 (FIG. 8). It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture-based servers 962; servers 963; blade servers 964; storage devices 965; and networks and networking components 966. In some embodiments, software components include network application server software 967, quantum platform routing software 968, and/or quantum software (not illustrated in FIG. 9).

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Non-limiting examples of workloads and functions which may be provided from this layer include: mapping and navigation 991; software development and lifecycle management 992; virtual classroom education delivery 993; data analytics processing 994; transaction processing 995; and quantum state preparation software 996.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer executable components stored in memory, wherein the computer executable components comprise:
a loading component that uses a context-aware distribution loading scheme to load arbitrary random distributions to facilitate preparing a quantum state of a probability distribution based on a structure of a quantum amplitude estimation algorithm; and
an operating component that:
constructs a quantum operator for stochastic processes based on the quantum state to perform quantum amplitude estimation;
wherein the stochastic process is given by an initial probability distribution and transition probabilities and the probability distribution is a joint probability distribution that is a function of the initial probability distribution and the transitional probabilities, and
wherein the quantum state corresponds to the joint probability distribution to facilitate exploitation of the quantum amplitude estimation;
adjusts Grover oracles in the quantum amplitude estimation employing multiple objective qubits.

2. The system of claim 1, wherein the loading component employs only a single functional description to construct the quantum state using quantum arithmetic for numerical integration, instead of employing repeated quantum arithmetic for the numerical integration.

3. The system of claim 1, wherein the operating component employs the multiple objective qubits in connection with simplifying or generalizing a problem.

4. The system of claim 1, wherein the operating component employs an arbitrary combination of products and sums of functions.

5. The system of claim 1, wherein the loading component prepares the quantum state based on the structure of the quantum amplitude estimation algorithm to reduce computational costs of the processor in loading arbitrary probability density functions into quantum states to be used in the quantum amplitude estimation algorithm executed on a quantum device, thereby facilitating extended practical application of the quantum amplitude estimation.

6. A computer-implemented method, comprising:
using, by a system operatively coupled to a processor, a context-aware distribution loading scheme to load arbitrary random distributions to facilitate preparing a quantum state of a probability distribution based on a structure of a quantum amplitude estimation algorithm;
constructing, by the system, a quantum operator for stochastic processes based on the quantum state to perform quantum amplitude estimation;
wherein the stochastic process is given by an initial probability distribution and transition probabilities and the probability distribution is a joint probability distribution that is a function of the initial probability distribution and the transitional probabilities, and wherein the quantum state corresponds to the joint probability distribution to facilitate exploitation of the quantum amplitude estimation; and adjusting, by the system, Grover oracles in the quantum amplitude estimation employing multiple objective qubits.

7. The computer implemented method of claim 6, further comprising:

employing, by the system, only a single functional description to construct the quantum state using quantum arithmetic for numerical integration, instead of employing repeated quantum arithmetic for the numerical integration.

8. The computer implemented method of claim 6, further comprising:

employing, by the system, the multiple objective qubits in connection with simplifying or generalizing a problem.

9. The computer implemented method of claim 6, further comprising:

employing, by the system, an arbitrary combination of products and sums of functions.

10. The computer program product of claim 9, wherein the program instructions are further executable by the processor to cause the processor to:

employ, by the processor, only a single functional description to construct the quantum state using quantum arithmetic for numerical integration, instead of employing repeated quantum arithmetic for the numerical integration.

11. The computer program product of claim 9, wherein the program instructions are further executable by the processor to cause the processor to:

employ, by the processor, the plurality of the objective qubits is associated with simplifying or generalizing a problem.

12. The computer program product of claim 9, wherein the program instructions are further executable by the processor to cause the processor to:

employ, by the processor, an arbitrary combination of products and sums of functions.

13. The computer program product of claim 9, wherein the program instructions are further executable by the processor to cause the processor to:

prepare, by the processor, the quantum state based on structure of the quantum amplitude estimation algorithm to reduce computational costs of the processor in loading arbitrary probability density functions into quantum states to be used in the quantum amplitude estimation algorithm executed on a quantum device, thereby facilitating extended practical application of the quantum amplitude estimation.

14. The computer implemented method of claim 6, further comprising:

preparing, by the system, the quantum state based on the structure of the quantum amplitude estimation algorithm to reduce computational costs of the processor in loading arbitrary probability density functions into quantum states to be used in the quantum amplitude estimation algorithm executed on a quantum device, thereby facilitating extended practical application of the quantum amplitude estimation.

15. A computer program product facilitating a quantum state preparation of a probability distribution process to perform amplitude estimation, the computer program product comprising a computer readable storage medium having program instructions embodied therewith, the program instructions executable by a processor to cause the processor to:

use, by the processor, a context-aware distribution loading scheme to load arbitrary random distributions to facilitate preparing a quantum state of a probability distribution based on a structure of a quantum amplitude estimation algorithm;

construct, by the processor, a quantum operator for stochastic processes based on the quantum state to perform quantum amplitude estimation;

wherein the stochastic process is given by an initial probability distribution and transition probabilities and the probability distribution is a joint probability distribution that is a function of the initial probability distribution and the transitional probabilities, and wherein the quantum state corresponds to the joint probability distribution to facilitate exploitation of the quantum amplitude estimation; and adjust, by the processor, Grover oracles in the quantum amplitude estimation to employ a defined number of a plurality of objective qubits.

16. A computer-implemented method, comprising:

performing, by a system operatively coupled to a processor, quantum amplitude estimation based on a context-aware distribution loading scheme to load arbitrary random distributions to facilitate preparing a quantum state of a probability distribution;

constructing, by the system, a quantum operator for arbitrary computable functions or stochastic processes based on the quantum state to perform quantum amplitude estimation;

employing, by the system, only a single functional description to construct the quantum state using quantum arithmetic for numerical integration, instead of employing repeated quantum arithmetic for the numerical integration; and employ, by the processor, multiple objective qubits to simplify or generalize a problem and adjust, by the processor, Grover operators to employ the multiple objective qubits.

* * * * *